Oct. 27, 1925.
L. S. KEILHOLTZ
ENGINE
Original Filed Sept. 26, 1923
1,559,107
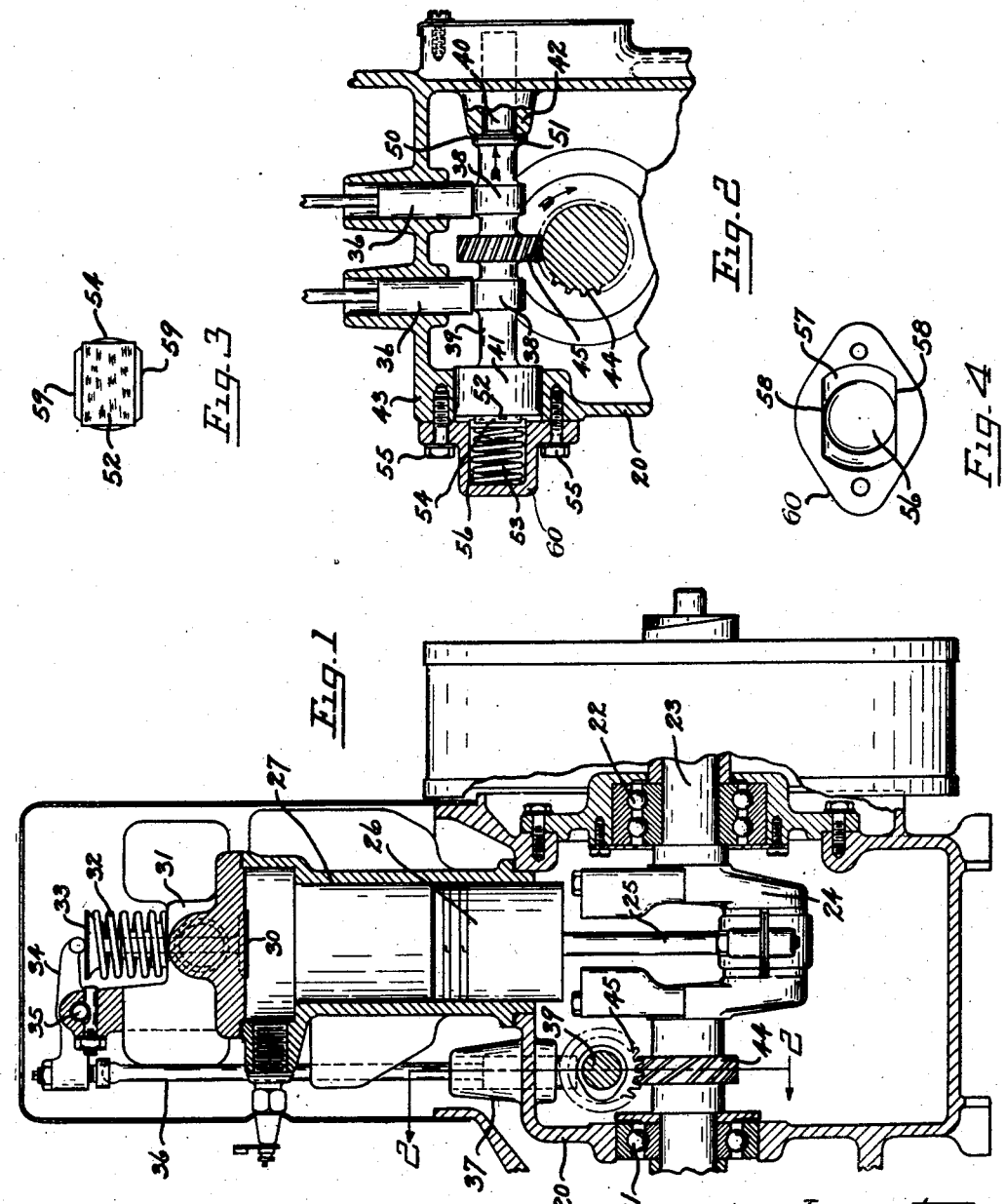
Inventor
Lester S. Keilholtz
By J. Ralph Lehr
His Attorney Patented Oct. 27, 1925.

1,559,107

UNITED STATES PATENT OFFICE.

LESTER S. KEILHOLTZ, OF DAYTON, OHIO, ASSIGNOR TO DELCO-LIGHT COMPANY, OF DAYTON, OHIO, A CORPORATION OF DELAWARE.

ENGINE.

Application filed September 26, 1923, Serial No. 664,945. Renewed July 23, 1925.

*To all whom it may concern:*

Be it known that I, LESTER S. KEILHOLTZ, a citizen of the United States of America, residing at Dayton, county of Montgomery, State of Ohio, have invented certain new and useful Improvements in Engines, of which the following is a full, clear, and exact description.

This invention relates to engines and includes among its objects the elimination of noise and compensation for wear in the mechanism for operating the valves of an engine.

Further objects and advantages of the present invention will be apparent from the following description, reference being had to the accompanying drawings, wherein a preferred form of embodiment of the present invention is clearly shown.

In the drawings:

Fig 1 is a fragmentary view of an internal-combustion engine partly in section;

Fig. 2 is a sectional view on line 2—2 of Fig. 1;

Fig. 3 is an end view of a friction member cooperating with the valve operating mechanism; and Fig. 4 is an end view showing a support for the friction members shown in Fig. 3.

Referring to the drawings, 20 designates the crank case of an internal-combustion engine which supports bearings 21 and 22 which support for rotation a crank shaft 23 provided with a crank 24 cooperating with a connecting rod 25 connected with a piston 26 which reciprocates in a cylinder 27.

The engine is provided with a plurality of poppet valves, one being shown at 30 in Fig. 1. Valve 30 is mounted to slide in the cylinder head 31 and is retained on its seat by means of a spring 32 bearing against a washer 33 carried by the stem of the valve 30.

The valve operating mechanism includes a rocker arm 34 pivotally mounted at 35 upon the cylinder head 31 and actuated by push rod 36 slidably mounted in a port 37 of the crank case 20. The lower end of the push rod is adapted to be engaged by cam 38 provided on cam shaft 39 having journals 40 and 41 mounted to rotate in bearings 42 and 43, respectively, provided by the crank case 20. The crank shaft 23 carries a spiral gear 44 meshing with a spiral gear 45 on the cam shaft 39. For each of the plurality of valves 30 there is a similar valve actuating mechanism. Obviously rotation of the crank shaft 23 will produce rotation of the cam shaft 39 and reciprocation of the valves 30 through the reciprocating push rods 36 and the oscillating rocker arms 34.

The elimination of noise and the compensation for wear in the valve mechanism is accomplished by a device for taking up the back lash in the gears 44 and 45, and for preventing endwise movement of the cam shaft 39. This device includes a non-metallic or fiber washer 50 located between the end surface of the bearing 42 and the shoulder 51 provided on the cam shaft 39, and also a non-metallic friction member 52 made of material such as cork which abuts the flat end surface of the journal portion 41 of cam shaft 39 and is held in yielding engagement therewith by means of a spring 53 bearing at one end against a member 54 which carries the friction material 52, and at the other end against a cap 60 secured by screws 55 to the crank case 20. As shown in Fig. 2 the cap 60 is provided with a recess 56 for receiving the spring 53 and with a recess 57 continuing from the recess 56. Recess 57 is bounded by the flat surfaces 58 cooperating with flat surfaces 59 on the retaining member 60 in order to prevent rotation of the friction member 52.

It is therefore apparent that the spring 53 operates yieldingly to maintain the fiber washer 50 in engagement with the shoulder 51 and the bearing 42 thereby taking up any end play in the shaft 39. Due to friction between the end surface of the enlarged journal 41 of the shaft 39 and the friction member 52, there is a tendency for the working faces of the gear teeth of gear 45 to remain in engagement with the working faces of the gear teeth of gear 44 although there may be some clearance between these gears. This frictional device tends to prevent intermittent separation of the working faces of the gears such as might occur due to the operation of the valve operating mechanism if no means were provided for overcoming the tendency of the springs 32 of the valve mechanism to produce rotation of the cam shaft 39 in a sense opposite that produced by the driving of the gear 45 by the gear 44.

It has been found that the present invention materially reduces the lash of the gear teeth of gears 44 and 45 thereby minimizing the wear on the gears and the noise resulting from the lashing of the gears.

The non-metallic washer 50 eliminates noise which might otherwise occur between the shoulder 51 and the bearing 42 if the washer were not present. Such noise might be produced by tendency of the thrust on shaft 39 to be reversed by the said tendency of the driving action between the gears 44 and 45 to be reversed.

While the preferred form of embodiment of the present invention as herein disclosed, constitutes a preferred form, it is to be understood that other forms might be adopted, all coming within the scope of the claims which follow.

What is claimed is as follows:

1. In valve operating mechanism for internal combustion engines and in combination with the crank case of the engine, a valve operating shaft the ends of which are supported in bearings in oppositely disposed walls of the crank case; a thrust collar adjacent one end of said shaft and cooperating with one of said bearings to prevent longitudinal movement of the shaft; a hollow cap removably secured to the exterior of said crank case and overlying the other end of said shaft; a friction member engaging said last mentioned end of said shaft; and a spring located within said hollow cap and acting against said friction member to press it against the last mentioned end of said shaft.

2. In valve operating mechanism for internal combustion engines and in combination with the crank case of the engine; a valve operating shaft the ends of which are supported in bearings in oppositely disposed walls of the crank case and one of which ends is enlarged to provide a journal for the end in question of the shaft; a thrust absorbing collar arranged adjacent the other end of said shaft and adapted to cooperate with the bearing thereat to restrain longitudinal movement of the shaft; a hollow cap removably secured to the exterior of said crank case over the enlarged end of said shaft; a friction member in contact with said enlarged end; means whereby rotary movement of said friction member is restrained by said cap; and a spring located within said hollow cap and acting to press said friction member against the enlarged end of said shaft.

3. Valve operating mechanism for internal combustion engines comprising, in combination, a crank shaft having a gear, a valve cam shaft having a gear meshing with the gear of the crank shaft, and a stationary friction member bearing against an end of the valve cam shaft, thereby maintaining the working faces of the gears in engagement.

In testimony whereof I hereto affix my signature.

LESTER S. KEILHOLTZ.